United States Patent
Park et al.

(10) Patent No.: US 11,762,513 B2
(45) Date of Patent: Sep. 19, 2023

(54) MESH-PATTERNED TOUCH PANEL AND LAMINATE HAVING THE SAME

(71) Applicant: DONGWOO FINE-CHEM CO., LTD., Iksan-si (KR)

(72) Inventors: Ki Joon Park, Hwaseong-si (KR); Sung Jin Noh, Hanam-si (KR); Jungu Lee, Suwon-si (KR)

(73) Assignee: DONGWOO FINE-CHEM CO., LTD., Iksan-si (KR)

(*) Notice: Subject to any disclaimer, the term of this patent is extended or adjusted under 35 U.S.C. 154(b) by 0 days.

(21) Appl. No.: 17/646,541

(22) Filed: Dec. 30, 2021

(65) Prior Publication Data

US 2022/0214766 A1 Jul. 7, 2022

(30) Foreign Application Priority Data

Jan. 4, 2021 (KR) .................. 10-2021-0000263

(51) Int. Cl.
*G06F 3/044* (2006.01)
*G06F 3/041* (2006.01)

(52) U.S. Cl.
CPC .......... *G06F 3/0443* (2019.05); *G06F 3/041* (2013.01); *G06F 3/0412* (2013.01); *G06F 2203/04103* (2013.01); *G06F 2203/04112* (2013.01)

(58) Field of Classification Search
CPC ......... G06F 3/0443; G06F 2203/04103; G06F 2203/04112; G06F 3/041; G06F 3/0412; G06F 3/04164; G06F 3/0445; G06F 3/0446; G02B 5/3025; H01B 1/02; H01B 5/14
See application file for complete search history.

(56) References Cited

U.S. PATENT DOCUMENTS

| | | | | |
|---|---|---|---|---|
| 2004/0238835 | A1* | 12/2004 | Grupp | G06F 3/041 257/98 |
| 2009/0096767 | A1* | 4/2009 | Liu | G06F 3/0443 438/30 |
| 2021/0065927 | A1* | 3/2021 | Takeyasu | H01B 5/14 |
| 2021/0357064 | A1* | 11/2021 | Kim | B32B 27/08 |

FOREIGN PATENT DOCUMENTS

| | | | | |
|---|---|---|---|---|
| JP | 6445365 B2 | 12/2018 | | |
| KR | 10-1401052 B1 | 5/2014 | | |
| KR | 10-2018-0097212 A | 8/2018 | | |
| WO | WO-2017183489 A1 * | 10/2017 | ............ | B32B 15/04 |
| WO | WO-2020159144 A1 * | 8/2020 | ............ | B32B 27/36 |

OTHER PUBLICATIONS

Machine translation of WO-2017183489-A1 (Year: 2017).*

* cited by examiner

*Primary Examiner* — Patrick N Edouard
*Assistant Examiner* — Joseph P Fox
(74) *Attorney, Agent, or Firm* — Sughrue Mion, PLLC

(57) ABSTRACT

A mesh-patterned touch panel includes a base layer, a first transparent oxide layer formed on the base layer, a metal electrode layer formed on the first transparent oxide layer, and a blackening layer formed on the metal electrode layer.

4 Claims, 2 Drawing Sheets

[Figure 1]
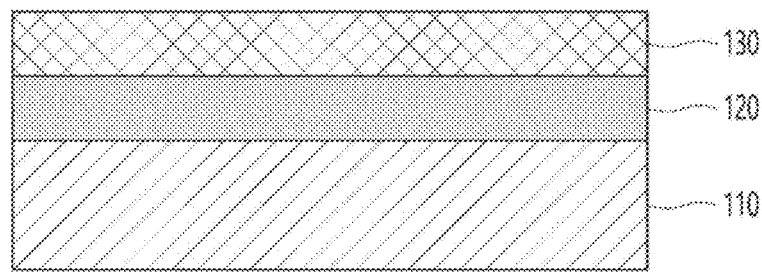
[Figure 2]
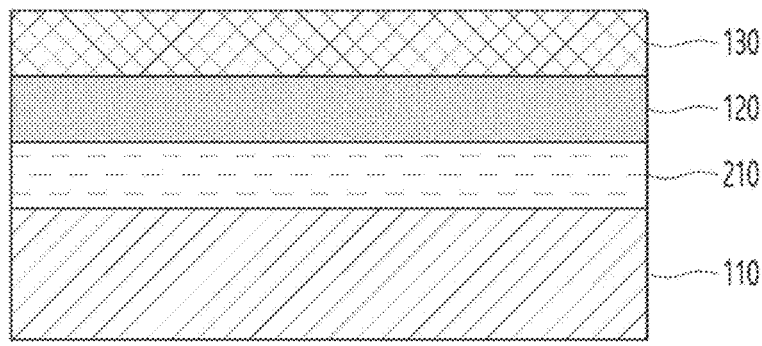
[Figure 3]
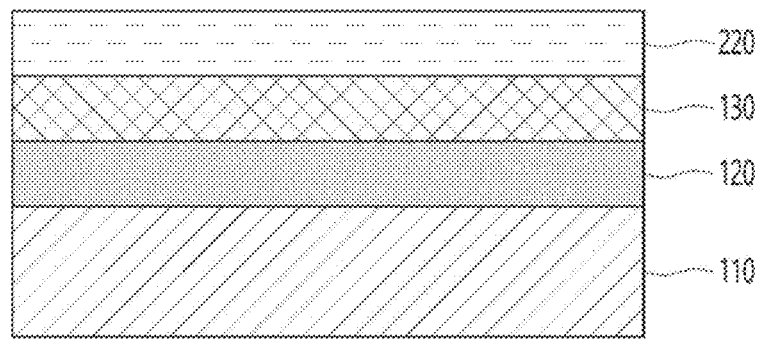

[Figure 4]
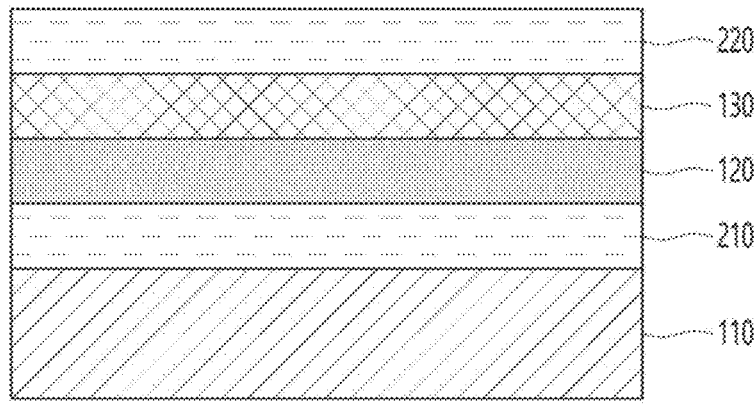
[Figure 5]
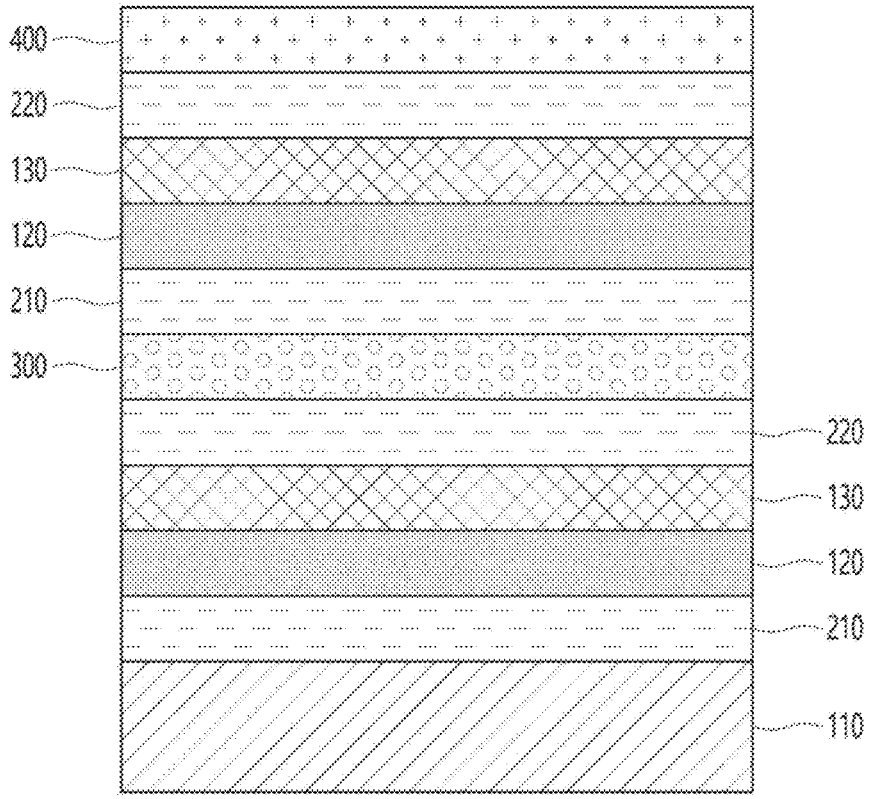

MESH-PATTERNED TOUCH PANEL AND LAMINATE HAVING THE SAME

CROSS REFERENCE TO RELATED APPLICATIONS

This application claims priority based on Korean Patent Application No. 10-2021-0000263, filed Jan. 4, 2021, the entire content of which is incorporated herein by reference in its entirety.

TECHNICAL FIELD

The present invention relates to a touch panel. Particularly, the present invention relates to a touch panel capable of increasing adhesion of a metal electrode and improving environmental reliability (e.g., corrosion of a metal layer).

BACKGROUND ART

A touch sensor of a smartphone or the like senses a touch signal and it may include a plurality of sensing electrodes. The sensing electrodes may be classified into the first sensing electrodes connected in the X axis direction and the second sensing electrodes connected in the Y axis direction. The sensing electrodes may respectively be connected to the first and second wiring parts. The first and second wiring parts may extend along side edges of the transparent substrate to be connected to pad electrodes formed at a bottom edge of the transparent substrate, i.e. bezel area. The pad electrode may then be connected to a flexible printed circuit board (FPCB) through an anisotropic conductive film (ACF) or the like.

FIG. 1 is a cross-sectional view of a mesh-patterned touch panel having a metal electrode layer with a blackening layer laminated according to the prior art.

As shown in FIG. 1, the touch panel may have a sensing electrode formed of a conductive metal instead of a transparent oxide in order to reduce the resistance. In this case, to address the problems of flexibility, transmittance, and visibility, the conductive metal is configured as the metal electrode layer 120 in the form of a mesh. Meanwhile, the conductive metal has a high reflectance due to the characteristics of the material. In order to lower the reflectance, as shown in FIG. 1, a blackening layer 130 is additionally formed on the metal electrode layer 120.

However, in this prior art, when the adhesion is measured with respect to the electrode (so-called, cross cut test), it shows a poor result of 1B (the ratio of the grid pattern to be peeled off is 35 to 65%).

In addition, in the prior art, when the environmental reliability is measured for the electrode (corrosion of the metal electrode layer after 240 hours), the corrosion is 10 to 30%, which is not a desirable result.

DISCLOSURE

Technical Problem

The present invention is to solve the above problems of the prior art and it is an object to increase adhesion of an electrode and improve environmental reliability (corrosion of a metal layer, etc.), in the electrode having a structure in which a metal layer having a mesh structure and a blackening layer are sequentially stacked on a base layer.

Technical Solution

A mesh-patterned touch panel according to embodiments of the present invention for achieving this purpose may include a base layer, a first transparent oxide layer, a metal electrode layer, a blackening layer, and so on.

The first transparent oxide layer may be formed on the base layer.

The metal electrode layer may be formed on the first transparent oxide layer.

The blackening layer may be formed on the metal electrode layer.

The mesh-patterned touch panel according to the present invention may further include a second transparent oxide layer. The second transparent oxide layer may be formed on the blackening layer.

The mesh-patterned touch panel according to the present invention may include a lower electrode layer composed of the first transparent oxide layer, the metal electrode layer, the blackening layer, and the second transparent oxide layer, described above, an insulation layer formed on the lower electrode layer, and an upper electrode layer having the same laminated structure as the lower electrode layer and formed on the insulation layer.

In the mesh-patterned touch panel according to the present invention, the metal electrode layer may be made of copper, and the transparent oxide layer may be made of IZO.

In the mesh-patterned touch panel according to the present invention, the metal electrode layer may be made of copper, and the transparent oxide layer may be made of AZO.

In the mesh-patterned touch panel according to the present invention, the transparent oxide layer may have a thickness of 10 to 200 Å.

Another aspect of the mesh-patterned touch panel according to the present invention may include a base layer, a metal electrode layer, a blackening layer, a transparent oxide layer, and so on.

The metal electrode layer may be formed on the base layer.

The blackening layer formed may be on the metal electrode layer.

The transparent oxide layer may be formed on the blackening layer.

In another aspect of the mesh-patterned touch panel according to the present invention, the metal electrode layer may be made of copper, and the transparent oxide layer may be made of IZO.

In another aspect of the mesh-patterned touch panel according to the present invention, the metal electrode layer may be made of copper, and the transparent oxide layer may be made of AZO.

In another aspect of the mesh-patterned touch panel according to the present invention, the transparent oxide layer may have a thickness of 10 to 200 Å.

A laminate according to the present invention may include the mesh-patterned touch panel described above and a window laminated on the mesh-patterned touch panel.

The laminate according to the present invention may further include a polarizing layer laminated on one surface of the mesh-patterned touch panel or the window.

The laminate according to the present invention may further include a decorative film laminated on one surface of the polarizing layer or the window.

The laminate according to the present invention may further include a wear-resistant layer laminated on an outermost surface of a viewing side of the window.

The laminate according to the present invention may further include a hard coating layer laminated between the window and the wear-resistant layer.

Advantageous Effects

In the present invention, a transparent oxide layer is inserted between the base layer and the metal electrode layer. Through this configuration, the adhesion of the electrode can be increased from the conventional 1B level to 5B (the ratio of the grid pattern to be peeled off is 0%).

In addition, the present invention forms a transparent oxide layer on the blackening layer, and through this configuration, corrosion of the metal electrode layer can be prevented and environmental reliability can be improved.

BRIEF DESCRIPTION OF THE DRAWINGS

FIG. 1 is a cross-sectional view of a mesh-patterned touch panel having a metal electrode layer with a blackening layer laminated according to the prior art.

FIG. 2 is a cross-sectional view of the first embodiment of a mesh-patterned touch panel having a metal electrode layer with a blackening layer laminated according to embodiments of the present invention.

FIG. 3 is a cross-sectional view of the second embodiment of a mesh-patterned touch panel having a metal electrode layer with a blackening layer laminated according to embodiments of the present invention.

FIG. 4 is a cross-sectional view of the third embodiment of a mesh-patterned touch panel having a metal electrode layer with a blackening layer laminated according to embodiments of the present invention.

FIG. 5 is a cross-sectional view of the fourth embodiment of a mesh-patterned touch panel having a metal electrode layer with a blackening layer laminated according to embodiments of the present invention.

BEST MODE

Hereinafter, embodiments of the present invention is described in more detail with reference to the accompanying drawings.

FIG. 2 is a cross-sectional view of the first embodiment of a mesh-patterned touch panel having a metal electrode layer with a blackening layer laminated according to the present invention.

As shown in FIG. 2, the first embodiment of a mesh-patterned touch panel according to the present invention may include a base layer 110, a first transparent oxide layer 210, a metal electrode layer 120, a blackening layer 130, and so on.

The base layer 110 is a base of the metal electrode layer 120, and may be composed of, for example, a cyclo-olefin polymer (COP), polycarbonate, polyethylene terephthalate (PET), polymethyl methacrylate, polyimide, polyethylene naphthalate, polyether sulfone, etc.

The base layer 110 may be a separation layer, a protective layer, or a laminate of a separation layer and a protective layer when the touch panel is manufactured by a transfer method.

The separation layer may be composed of an organic polymer film, for example, polyimide, poly vinyl alcohol, polyamic acid, polyamide, polyethylene, polystyrene, polynorbornene, etc.

The protective layer may include at least one of an organic insulation layer or an inorganic insulation layer, and it can be formed through coating/curing or deposition.

The first transparent oxide layer 210 is formed between the base layer 110 and the metal electrode layer 120. It has a main function to increase the adhesion of the electrode having the metal electrode layer 120 and it can minimize the corrosion of the metal electrode layer 120 as well.

The first transparent oxide layer 210 may be composed of, for example, a conductive oxide such as indium zinc oxide (IZO), aluminum zinc oxide (AZO), aluminum oxide ($Al_2O_3$). Also, indium zinc tin oxide (IZTO), indium oxide ($InO_x$), tin oxide ($SnO_x$), cadmium tin oxide (CTO), gallium-doped zinc oxide (GZO), zinc tin oxide (ZTO), indium gallium oxide (IGO), or a combination of two or more thereof can be used. Among the above oxides, indium zinc oxide (IZO) is most suitable for strengthening adhesion and minimizing corrosion, followed by aluminum zinc oxide (AZO), which is inferior to indium zinc oxide (IZO) in strengthening adhesion, but was found to be sufficient for use.

The first transparent oxide layer 210 may have a thickness of 10 to 200 Å. If the thickness of the first transparent oxide layer 210 does not reach 10 Å, it is difficult to exhibit sufficient adhesion, and it is not effective to block corrosion of the metal electrode layer 120, either. On the other hand, when the thickness of the first transparent oxide layer 210 exceeds 200 Å, the sheet resistance increases, which is not preferable.

The first transparent oxide layer 210 may have the same shape as the metal electrode layer 120, that is, a mesh shape.

The metal electrode layer 120 is a sensing electrode for sensing a touch, which may be formed of a mesh pattern on the first transparent oxide layer 210. The metal electrode layer 120 may be composed of a conductive metal. The conductive metal may be, for example, gold (Au), silver (Ag), copper (Cu), molybdenum (Mo), aluminum (Al), palladium (Pd), neodymium (Nd), silver-palladium-copper alloy (APC), etc.

The metal electrode layer 120 may consist of a conductive metal alone, or it can also be comprised of laminates, such as a triple layer of nickel-copper layer/copper layer/nickel-copper layer, a triple layer of nickel-copper layer/copper layer/nickel layer, a double layer of nickel-copper layer/copper layer, or a triple layer of black nickel layer/copper layer/black nickel layer.

The metal electrode layer 120 may have a line width of 1.0 μm or more and 2.5 μm or less. When the line width is smaller than 1.0 μm, the resistance increases, which is not preferable. When the line width exceeds 2.5 μm, the resistance decreases, but it is not preferable because it can be visually recognized.

The metal electrode layer 120 may have a thickness of 0.2 μm or more and 0.8 μm or less. If the thickness of the metal electrode layer 120 is less than 0.2 μm, it may be difficult to secure adhesion in addition to increase in resistance. On the other hand, when the thickness of the metal electrode layer 120 exceeds 0.8 μm, the side effect of the increase in thickness of the touch panel may be greater than the benefit of reducing the resistance.

The metal electrode layer 120 may be formed by a sputtering method, etc. and even in a multi-layered structure, the sputtering process may be performed several times.

The blackening layer 130 improves visibility by reducing the reflectance of the metal electrode layer 120 and may be formed on the metal electrode layer 120 in the same shape as the first transparent oxide layer 210 and the metal electrode layer 120, that is, a mesh structure.

The blackening layer 130 may be formed by depositing a blackening composition on the metal electrode layer 120. For example, the blackening layer 130 may be formed through a reactive sputtering process. The blackening layer 130 may be formed by a reactive sputtering method with, for example, a CAT (Cu—Al—Ti) target, which is a three-component alloy, argon (Ar) gas, and a reactive gas. In this case, the reactive gas may be oxygen ($O_2$) or nitrogen ($N_2$). As such, when the reactive sputtering process is used, the metal electrode layer 120 and the blackening layer 130 may be continuously formed.

The blackening layer 130 may have a thickness of 300 to 500 Å. If the thickness of the blackening layer 130 is less than 300 Å, the reflectance of the metal electrode layer 120 may increase. On the other hand, when the thickness of the blackening layer 130 exceeds 500 Å, the sheet resistance increases, which is not preferable.

In the first embodiment, the base layer 110, the first transparent oxide layer 210, the metal electrode layer 120, the blackening layer 130, etc. may be laminated first and then a mesh structure pattern may be formed by batch etching.

FIG. 3 is a cross-sectional view of the second embodiment of a mesh-patterned touch panel having a metal electrode layer with a blackening layer laminated according to the present invention.

The touch panel of the second embodiment may include a base layer 110, a metal electrode layer 120, a blackening layer 130, a second transparent oxide layer 220, and so on.

In the second embodiment, the metal electrode layer 120 may be formed on the base layer 110, and the blackening layer 130 may be formed on the metal electrode layer 120. Since the base layer 110, the metal electrode layer 120, and the blackening layer 130 have the same configuration as the corresponding components of the first embodiment above, detailed descriptions thereof are replaced with the related description of the first embodiment above.

In the second embodiment, the second transparent oxide layer 220 may be formed on the blackening layer 130.

The second transparent oxide layer 220 may minimize the corrosion of the metal electrode layer 120 to improve the environmental reliability, and may increase the adhesion of the electrode having the metal electrode layer 120 as well.

The second transparent oxide layer 220 may be composed of the same material as the first transparent oxide layer 210 of the first embodiment, for example, indium zinc oxide (IZO), aluminum zinc oxide (AZO), etc. Here, as for the second transparent oxide layer 220, indium zinc oxide (IZO) may be the most suitable for minimizing corrosion and strengthening adhesion, and then, aluminum zinc oxide (AZO) may be preferable.

The second transparent oxide layer 220 may have a thickness of 10 to 200 Å, same as that of the first transparent oxide layer 210.

In the second embodiment, the base layer 110, the metal electrode layer 120, the blackening layer 130, and the second transparent oxide layer 220 may be laminated first and then a mesh structure pattern may be formed by batch etching.

FIG. 4 is a cross-sectional view of the third embodiment of a mesh-patterned touch panel having a metal electrode layer with a blackening layer laminated according to the present invention.

The touch panel of the third embodiment may include a base layer 110, a first transparent oxide layer 210, a metal electrode layer 120, a blackening layer 130, a second transparent oxide layer 220, and so on.

In the third embodiment, like the first embodiment, the first transparent oxide layer 210 may be formed on the base layer 110, the metal electrode layer 120 may be formed on the first transparent oxide layer 210, and the blackening layer 130 may then be formed on the metal electrode layer 120.

In the third embodiment, like the second embodiment, the second transparent oxide layer 210 may be formed on the blackening layer 130.

In the third embodiment, since the base layer 110, the first transparent oxide layer 210, the metal electrode layer 120, and the blackening layer 130 have the same configuration as the corresponding components of the first embodiment above, detailed descriptions thereof are replaced with the related description of the first embodiment above. The second transparent oxide layer 220 has the same configuration as the corresponding component of the second embodiment above, detailed descriptions thereof are replaced with the related description of the second embodiment above.

In the third embodiment, the base layer 110, the first transparent oxide layer 210, the metal electrode layer 120, the blackening layer 130, and the second transparent oxide layer 220 may be laminated first and then a mesh structure pattern may be formed by batch etching.

Table 1 below shows the measurements of adhesion and environmental reliability (corrosion of the metal electrode layer) for the prior art (FIG. 1) and the first to third embodiments (FIGS. 2 to 4). Here, the adhesion was measured by a cross cut test. For environmental reliability, the degree of corrosion of the copper (Cu) layer was measured after 240 hours.

In the cross cut test, after cutting in the form of a grid, it was rubbed diagonally 5 times using a brush (shoe brush, etc.), and a tape was attached to the test surface and then peeled off. At this time, if there were no falling grid cells, it was indicated as 5B, 5% or less, 4B, more than 5% and 15% or less, 3B, more than 15% and 35% or less, 2B, and more than 35% and 65% or less, 1B.

The environmental reliability is indicated by ○ if corrosion does not occur in the copper layer after 240 hours, Δ when corrosion occurs at 10% or less, and x when corrosion occurs at more than 10 and 30% or less.

TABLE 1

| | | Environmental reliability (Cu corrosion) | | |
|---|---|---|---|---|
| | Adhesion | −40° C. | 60° C. | 80° C. |
| Prior art (FIG. 1) | 1B | Δ | x | x |
| First embodiment (FIG. 2) | 5B | Δ | x | x |
| Second embodiment (FIG. 3) | 3B~4B | Δ | Δ | Δ |
| Third embodiment (FIG. 4) | 5B | ○ | ○ | ○ |

Referring to Table 1 above, the first embodiment of FIG. 2 (where a transparent oxide layer is added under the metal layer) showed better results than the prior art of FIG. 1 in adhesion. The second embodiment of FIG. 3 (where a transparent oxide layer is added on top of the metal layer) showed better results than the prior art of FIG. 1 in terms of environmental reliability.

The third embodiment of FIG. 4 (where transparent oxide layers are added to both over and under the metal layer) showed satisfactory results in both adhesion and environmental reliability. In particular, in the third embodiment, both adhesion and environmental reliability were improved even compared with the first and second embodiments.

These results can be understood that the transparent oxide layer contributes to both adhesion and environmental reliability.

FIG. 5 is a cross-sectional view of the fourth embodiment of a mesh-patterned touch panel having a metal electrode layer with a blackening layer laminated according to the present invention.

As shown in FIG. 5, the touch panel according to the fourth embodiment includes a laminate of a first transparent oxide layer 210, a metal electrode layer 120, a blackening layer 130, a second transparent oxide layer 220 described in the third embodiment above as a lower electrode layer, an insulation layer 300 is formed thereon, and an upper electrode layer having the same laminated structure as that of the lower electrode layer is formed on the insulation layer 300.

In the fourth embodiment, since the lower electrode layer and the upper electrode layer have the same configuration as the corresponding components of the third embodiment above, detailed descriptions thereof are replaced with the related description of the third embodiment above.

The insulation layer 300 insulates the lower electrode layer and the upper electrode layer, and may be formed of a thermosetting or photocurable organic material such as an epoxy compound, an acrylic compound, a melanin compound, etc.

In the fourth embodiment, a passivation layer 400 may be formed on the second transparent oxide layer of the upper electrode layer. The passivation layer 400 insulates and protects the upper electrode layer, and may be composed of one or more materials selected from a curable prepolymer, a curable polymer, and a plastic polymer, which are insulators.

The passivation layer 400 may be made of a varnish-type material capable of forming a film. The varnish-type material may be polysilicon, such as polydimethylsiloxane (PDMS) or polyorganosiloxane (POS), polyimide, or polyurethane, such as spandex. The varnish-type material is a soft insulation material and can increase the stretchability and dynamic folding capability of the touch panel.

In the fourth embodiment, the lower electrode layer, the insulation layer, and the upper electrode layer may be laminated first and then a mesh structure pattern may be formed by batch etching.

A laminate according to the present invention may include the mesh-patterned touch panel described above and a window laminated on the mesh-patterned touch panel.

The laminate according to the present invention may further include a polarizing layer laminated on one surface of the touch panel or the window. As the polarizing layer, for example, those in which a protective layer is formed on at least one surface of a polarizer dyed with iodine or a dichroic dye after stretching a polyvinyl alcohol film, a liquid crystal aligned to have the performance of a polarizer, a transparent film coated with an oriented resin such as polyvinyl alcohol, and then stretched and dyed, or the like may be used.

The laminate according to the present invention may further include a decorative film laminated on one surface of the polarizing layer or the window. The decorative film may include a protective layer, a black matrix, a planarization layer, and so on.

The laminate according to the present invention may include a wear-resistant layer on the outermost surface of the viewing side.

The wear-resistant layer may be formed, for example, on the surface of the viewing side of the hard coating layer to improve wear resistance or prevent contamination by sebum or the like. Here, the hard coating layer may be formed on the window.

The wear-resistant layer may include a structure derived from a fluorine compound. The fluorine compound may have a silicon atom, and it may be preferable to have a hydrolyzable functional group such as an alkoxy group or halogen on the silicon atom.

The hydrolyzable functional group may form a coating film by a dehydration condensation reaction, and may also react with active hydrogen on the surface of the substrate to improve adhesion of the wear-resistant layer.

In addition, when the fluorine compound has a perfluoroalkyl group or a perfluoropolyether structure, it may impart water repellency, which may be preferable. A fluorinated polyorganosiloxane compound having a perfluoropolyether structure and a long-chain alkyl group having 4 or more carbon atoms may be particularly preferable.

As the fluorine compound, two or more types of compounds may be used. It may be preferable to further include a fluorinated organosiloxane compound containing an alkylene group having 2 or more carbon atoms and a perfluoroalkylene group.

The thickness of the wear-resistant layer may be 1 to 20 nm. The wear-resistant layer may have water repellency, and the water contact angle may be 110 to 125°.

The contact angle hysteresis and the dynamic contact angle measured by the sliding contact angle measurement method may be 3 to 20° and 2 to 55°, respectively.

Furthermore, the wear-resistant layer may contain various additives such as a silanol condensation catalyst, an antioxidant, a corrosion inhibitor, an ultraviolet absorber, a light stabilizer, an antibacterial agent, a deodorant, a pigment, a flame retardant, an antistatic agent, etc., in the range that does not impair the effects of the present invention.

A primer layer may be formed between the wear-resistant layer and the hard coating layer. As the primer agent, for example, an epoxy-based compound of an ultraviolet curing agent, a thermosetting agent, a moisture curing agent, or a two-component curing agent can be used.

As the primer agent, a polyamic acid may be used or a silane coupling agent may be used. The thickness of the primer layer may be 0.001 to 2 μm.

In the method of laminating the wear-resistant layer on the hard coating layer, a primer layer is formed by applying, drying, and curing a primer agent as necessary on the hard coating layer, and then a composition containing a fluorine-based compound (composition for wear-resistant coating) can be applied and dried to form a wear-resistant layer. As the coating method, for example, a dip coating method, a roll coating method, a bar coating method, a spin coating method, a spray coating method, a die coating method, a gravure coating method, or the like can be used.

In addition, before applying the primer agent or the composition for wear-resistant coating layer, it may be preferable to perform a hydrophilization treatment such as primer treatment, corona treatment, or ultraviolet treatment on the coated surface.

The laminate of the wear-resistant layer and the hard coating layer may be formed directly on the window, or laminated on a separate transparent substrate, followed by bonding to the window using an adhesive or a pressure-sensitive adhesive.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

110: base layer
120: metal electrode layer
130: blackening layer
210: first transparent oxide layer
220: second transparent oxide layer
300: insulation layer
400: passivation layer

The invention claimed is:

1. A mesh-patterned touch panel, comprising:
a base layer;
a first transparent oxide layer formed on the base layer;
a metal electrode layer formed on the first transparent oxide layer;
a blackening layer formed on the metal electrode layer;
a second transparent oxide layer formed on the blackening layer;
an insulation layer formed on the second transparent oxide layer;
another first transparent oxide layer formed on the insulation layer;
another metal electrode layer formed on the another first transparent oxide layer;
another blackening layer formed on the another metal electrode layer; and
another second transparent oxide layer formed on the another blackening layer.

2. The mesh-patterned touch panel of claim 1, wherein:
the metal electrode layer is made of copper; and
the transparent oxide layer is made of IZO (Indium Zinc Oxide).

3. The mesh-patterned touch panel of claim 1, wherein:
the metal electrode layer is made of copper; and
the transparent oxide layer is made of AZO (Aluminum Zinc Oxide).

4. The mesh-patterned touch panel of claim 1, wherein the transparent oxide layer has a thickness of 10 to 200 Å.

* * * * *